Sept. 9, 1924.  
M. L. ZOBEL  
1,507,653  
COMPASS RELAY TRANSMITTER  
Filed Oct. 20, 1919  
2 Sheets-Sheet 1

INVENTOR  
Maurice L. Zobel  
BY  
Herbert H. Thompson  
HIS ATTORNEY

Sept. 9, 1924.
M. L. ZOBEL
COMPASS RELAY TRANSMITTER
Filed Oct. 20, 1919  2 Sheets-Sheet 2
1,507,653
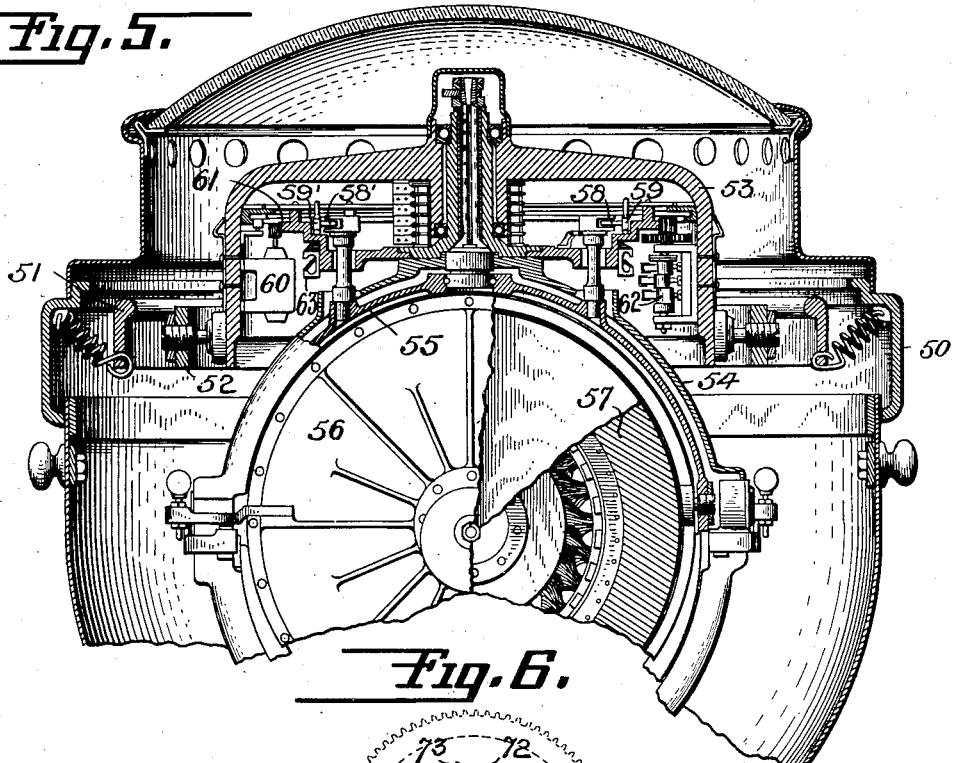
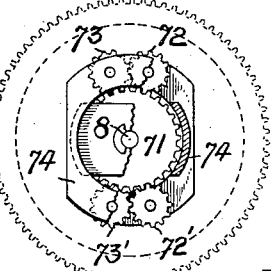
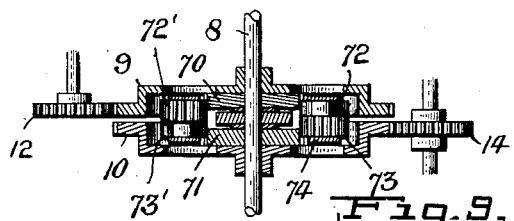
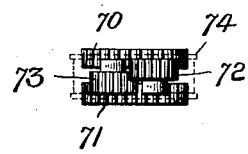
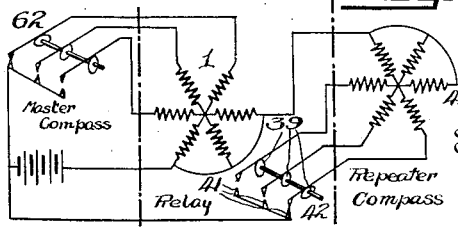
Inventor
Maurice L. Zobel.
By his Attorney
Herbert H. Thompson Patented Sept. 9, 1924.

1,507,653

UNITED STATES PATENT OFFICE.

MAURICE L. ZOBEL, OF ROSEBANK, NEW YORK, ASSIGNOR TO THE SPERRY GYROSCOPE COMPANY, OF BROOKLYN, NEW YORK, A CORPORATION OF NEW YORK.

COMPASS RELAY TRANSMITTER.

Application filed October 20, 1919. Serial No. 331,879.

*To all whom it may concern:*

Be it known that I, MAURICE L. ZOBEL, citizen of the United States, residing at 437 Home Avenue, Rosebank, New York, in the county of and State of New York, have invented certain new and useful Improvements in Compass Relay Transmitters, of which the following is a specification.

This invention relates to relay transmitters and more specifically to means for effecting the repetition of the movements of an instrument such as a master or gyroscopic compass in the repeater compasses or fire control or other instruments which are controlled in whole or in part by the master compass or sending instrument.

As is well known, it is the usual custom in master gyro compasses to cause a constant relative movement back and forth to take place between the compass card and the lubber ring to keep the suspension bearing of the sensitive element always free from sticking so that it will yield to the slightest tendency of the sensitive element to turn by reason of the directive force exerted by the gyroscope or gyroscopes. This constant relative movement of the compass card and lubber ring is termed "the hunt" or "hunting" as fully described in the U. S. patent to Elmer A. Sperry 1,300,890, dated April 15, 1919, for navigational instrument. In transmitting the readings of the master compass to the repeater compasses located in various parts of the ship, which comprises transmitting the relative positions and movements of the compass card and lubber ring of the master to the corresponding card and ring of each repeater, it is sometimes undesirable to transmit this hunting movement of the master. Also, where the compass is used to control the positioning of certain parts of fire control instruments, it is necessary to eliminate the hunt from the movements transmitted.

In existing relay transmitters, a system of sliding contacts is used, wherein a movable contact controlled by the relative movements of the compass card and lubber ring of the master compass moves normally back and forth across a narrow strip or dead contact between two live contacts. The sliding of the movable contact upon one or the other of the said live contacts closes a circuit through one or the other set of oppositely wound coils of a motor to cause the latter to turn in one direction or the other according to which direction the master compass card has turned with respect to the lubber ring. The movements of this motor are then transmitted to the cards of the repeater compasses. The width of the dead contact or the space between the live contacts is such that so much of the movement of the movable contact as represents the hunting movement of the master compass takes place between said live contacts without touching either thereof, so that no part of this motion is transmitted to the repeaters. But any relative movement of the compass card and lubber ring in excess of the hunting movement in one direction or the other causes a corresponding excessive movement of the movable contact, causing the latter to engage one of the live contacts to effect the proper actuation of the repeater compasses.

Several inherent difficulties reside in this type of relay transmitter, due in part to the wearing of the constantly moving sliding contacts and to the parts of the apparatus getting out of adjustment.

The objects of the present invention are to produce an instrument for relaying the movements other than the hunt of the master compass to the repeater instruments, and in which sliding contacts are eliminated in favor of the more reliable make-and-break type of contact, and wherein the fine adjustments may be more readily and more reliably effected.

A further object of the invention is to enable a single sending instrument to control a larger number of repeaters than has hitherto been thought possible.

Referring to the drawings wherein I have shown what I now consider to be the preferred form of my invention Fig. 1 is a plan view of the relay transmitter.

Figure 1:
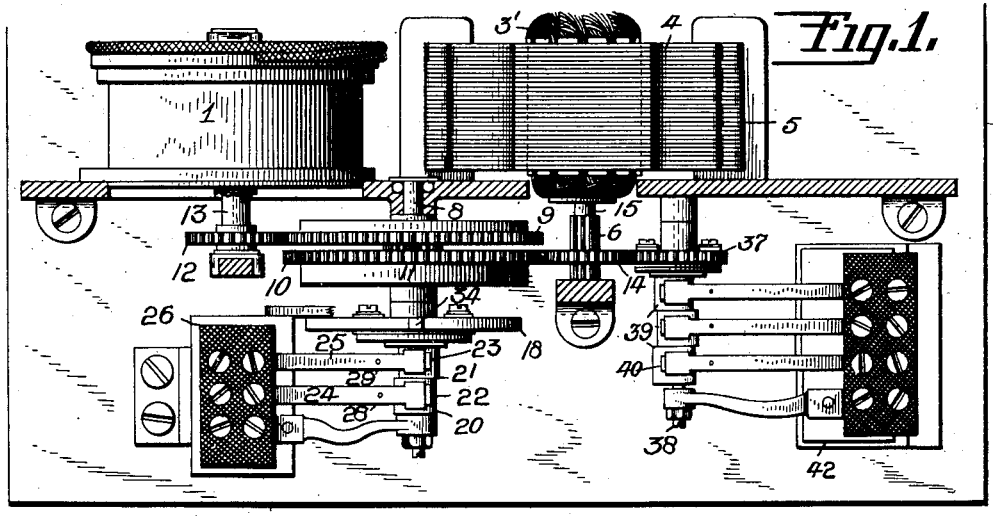
Figure 2:
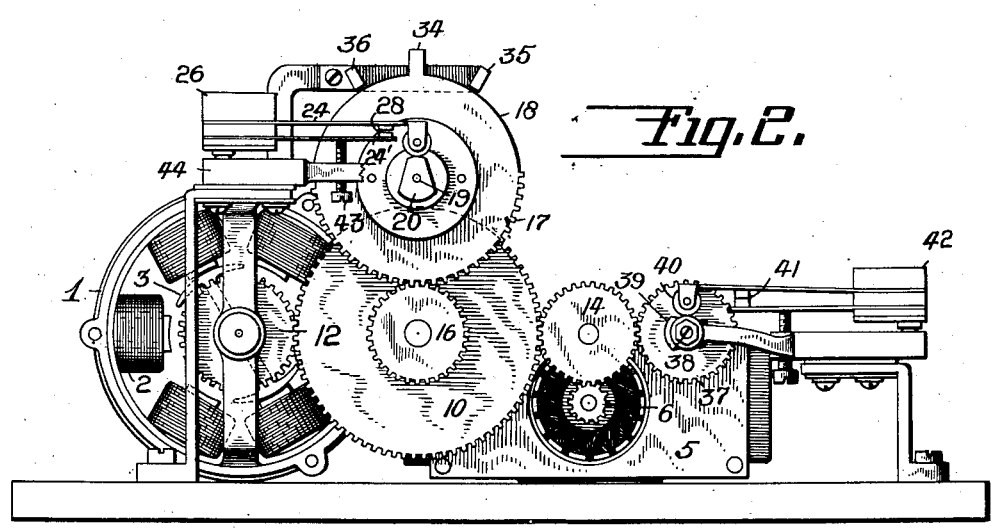
Fig. 2 is a front elevation thereof.

Fig. 5 is a front elevation, partly in section, of a gyroscopic compass typifying the sending instrument used for actuating the relay of this invention. Figs. 6, 7, and 8 are details of the differential gearing shown in Fig. 1. Fig. 9 is a wiring diagram showing the connections between the relay and the master compass on one hand and the repeater compasses on the other.

In Fig. 5 of the drawings is shown the form of sending instrument for which my relay is particularly adapted. The sending instrument in this instance is a Sperry gyroscopic compass comprising as the principal elements thereof an outer frame 50 supporting the gimbal rings 51 and 52, the inner ring supporting the spider 53. From said spider is suspended the follow-up outer frame 54 and the sensitive element, so called, comprising in this instance the vertical ring 55 and the gyro casing proper 56. In said casing is mounted on suitable bearings the electrically spun gyro wheel 57. Pairs of contacts 58 and 59, 58' and 59' are provided between the sensitive element and the follow-up support for the purpose of causing said support to follow the movements of the element in azimuth. Said contacts control the follow-up motor 60 which is geared to annular gear 61 secured to the follow-up element. Also geared to said annular gear is a step-by-step or other suitable transmitter 62 adapted to transmit the compass readings through suitable repeating devices operated by step-by-step or other repeater motors. Also mounted on said follow-up element is shown an eccentric or cam ring 63 for the purpose of correcting the readings of the compass for changes in heading of the ship, as fully explained in the U. S. patent to Elmer A. Sperry 1,255,480, "Navigational instrument," dated February 5, 1918. As heretofore explained in a gyroscopic compass of the type illustrated the follow-up element is maintained in a constant state of oscillation through a small angle, this being accomplished by any suitable means such as a relay (not shown) operating between the contacts 58 and 59 and the reversible motor 60.

The repeater motor 1 of my relay (Fig. 1) is adapted to be actuated from said step-by-step transmitter 62. The poles 2 of the repeater motor are energized in a proper sequence by the closing of the contacts of the transmitter. Said transmitter may be in all respects similar to the transmitter 42 forming a part of my instrument and hereinafter described in detail. The armature of the motor is shown as an unwound, soft iron armature which it will be understood reproduces all movements of the transmitter including the hunting action of the follow-up system. 3' represents the armature and 4 the fields of a motor 5. Differentially geared upon a shaft 8 are a pair of gear wheels 9, 10. The details of construction of the differential are more fully described hereafter. Gear 9 is shown meshing with a gear 12 fixed on shaft 13 of the repeater motor 1, while gear 10 meshes with an idler 14 which meshes with a pinion 6 fixed on the shaft 15 of motor 5. Fixed on shaft 8 is a gear 16 meshing with teeth 17 formed part way around the circumference of a wheel 18 in turn fixed on shaft 19 which also carries a pair of cams 20, 21. These cams engage rollers 22, 23 carried by resilient arms 24, 25 secured to a block 26, so that rotation of shaft 19 with said cams raises and lowers said rollers to open and close electrical non-friction make-and-break contacts 28, 29.

Figure 3:
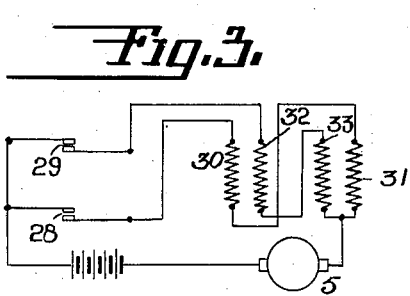
Fig. 3 is a wiring diagram showing the connections between the reversing contacts and reversible motor.

As shown in the wiring diagram in Fig. 3 closure of contact 28 completes a circuit through field coils 30, 31 of motor 5, while closure of contact 29 completes a circuit through oppositely wound coils 32, 33 so that the motor will be driven in one direction or the other depending upon which contact is closed and will remain idle when both sets of contacts are open.

Wheel 18 may be provided with a projection 34 operating between a pair of stops 35, 36 to limit the extent of rotation of shaft 19 with cams 20, 21.

Meshing with idler 14 is a gear 37 fixed on a shaft 38 which carries a plurality of cams 39 engaging rollers 40 for the purpose of opening and closing a series of contacts 41 similar to contacts 38, 39 and forming a step by step transmitter 42. Said transmitter it will be understood is adapted to actuate repeater compasses or other repeater instruments typified by repeater motor 42' in the wiring diagram, Fig. 9.

The operation of the device is as follows: The repeater motor 1, whether carried on the master gyro-compass or at a distance therefrom, as for instance, on the switch panel, is adapted to follow all of the movements of the master compass card relative to the lubber ring, including the hunting oscillations, the movement caused by the directive force of the gyroscope and the relative movement of the card and ring effected by the reading correctors, as more specifically set forth in United States Letters Patent to Elmer A. Sperry, Nos. 1,255,480 dated February 5, 1918 and 1,300,890 dated April 15, 1919. The movements of the repeater motor are transmitted through gear 12 to differential wheel 9, and because of the resisting torque in wheel 10 caused by its connection to motor 5, such movements are continued through shaft 8 and intermediate parts to the cams 20, 21. One form of differential gearing operating between the gears 9 and 10 is shown in Figs. 6, 7, and 8. Within gear 9 and connected thereto is a smaller spur gear 70, while within gear 10 and also connected thereto is a smaller spur gear 71. Both gears 9 and 10, it will be understood, are loosely mounted on the shaft 8. Meshing with the gear 70 is a pinion 72, while a pinion 73 meshes with said pinion and also with gear 71 (see Fig. 8). Both pinions are mounted in a frame or planetary arm 74 secured to shaft 8. A duplicate pair of pinions 72' and 73' may also be provided on said arm if desired. It will be understood that any suitable form of differential connection or gearing may be substituted for the type herein described.

Figure 4:
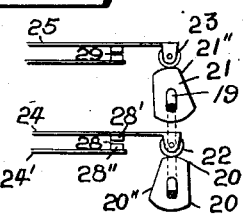
Fig. 4 is a diagrammatic detail of electric contacts and actuating cams therefor.

From an examination of Fig. 4 it will be seen that rotation of shaft 19 in a clockwise direction will cause roller 22 to ride from the top 20' of cam 20 down on to the side 20'' thereof so that the upper point 28' of contact 28 will be lowered into engagement with point 28'', effecting the rotation of motor 5 in a given direction as previously pointed out. This rotation of motor 5 will then effect the rotation of member 10 of the differential gearing in the opposite direction to the rotation of member 9 as caused by repeater motor 1. This will, of course, rotate shaft 19 in a counter-clockwise direction, causing roller 22 to ride back upon the top 20' of the cam to open contact 28, de-energizing motor 5 so that it will stop. In the mean time, the turning of motor 5 will have actuated gear 37 and cams 39 of the transmitter 42 to cause actuation of the repeater instruments.

If, on the other hand, repeater motor 1 effects the rotation of shaft 19 in a counter-clockwise direction, roller 23 will ride down upon the side 21'' of cam 21 to close contact 29 and cause motor 5 to turn in the opposite direction. This in turn will effect a rotation of member 10 in an opposite direction to return roller 23 to the top of cam 21, opening contact 29 and stopping motor 5. Motor 5 will in the mean time have rotated cams 39 in the opposite direction to that in which it was previously rotated.

Obviously, the greater the gaps in contacts 28, 29 the farther must shaft 19 and cams 20, 21 rotate to effect the closure of said contacts. Also, the lower arm 24' of each of said contacts is provided with a tendency to bend downwardly, while screws 43 reaching through a bracket 44 are adapted to press upwardly against said arms, so that by adjustment of said screws the width of said gaps may be regulated.

By thus regulating the degree through which shaft 19 must turn to close contacts 28, 29 I also regulate the degree through which the master compass card and repeater motor 1 must turn in order to effect the closure of said contacts. By this means I may adjust the gaps in these contacts so that all of the movement of the repeater motor caused by the hunting of the master compass card may take place without closing the contacts. Any additional movement, however, due to directive force of the gyroscope or to corrections will close said contacts and effect the actuation of motor 5 and transmitter 42. In this way, all corrections made to the master compass and all directive movements thereof will be transmitted to the repeater instruments, while no part of the hunting movement will reach the repeaters.

If at any time the motor 5 should tend to lag behind the movement of cams 20, 21 the projection 34 is adapted to engage one of stops 35, 36 to stop wheel 18 so that presuming shaft 19 to be turning in a clockwise direction, cams 20, 21 may turn far enough to close contact 28 but not far enough to close contact 29. The shaft 8 being now locked against further rotation, the power of motor 1 will all be diverted through the differential gearing to motor 5 to help turn the same until it shall gather sufficient speed to return the cams toward their normal position.

In accordance with the provisions of the patent statutes, I have herein described the principle of operation of my invention, together with the apparatus, which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. In a relay transmitter, a repeater motor adapted to be controlled by movements of a sending instrument, a second motor, a cam, gearing differentially connected to said repeater motor, said second motor and said cam, an electrical contact controlled by said cam, and electrical connections between said contact and said second motor for controlling the latter.

2. In a relay transmitter, a repeater motor adapted to be controlled by movements of a sending instrument, a second motor, a cam, gearing differentially connected to said repeater motor, said second motor, and said cam, an electrical contact controlled by said cam, electrical connections between said contact and said second motor for controlling the latter, and electrical contacts adapted to be opened and closed by said second motor.

3. In a relay, a repeater motor, a second motor differentially connected thereto, electrical contacts differentially connected to both of said motors for actuation by the turning of either or both thereof, said second motor being controlled by said contacts for actuation in either direction dependent upon the position of said contacts and so connected through said differential as to return said contacts to normal position and electrical transmitting means actuated by said second motor for transmitting to a distance the movements of the relay.

4. In combination, a repeater motor, a second motor, electrical contacts, gearing differentially interconnecting said motors and said contacts, said second motor being electrically controlled by said contacts for turning in either direction dependent upon the positions of said contacts, a transmitter element actuated by said second motor, said differential connections being such that said second motor when actuated returns said contacts to normal positions, and a stop associated with said contacts for limiting the actuation thereof, said differential connections being also such that when said stop operates said repeater motor will tend to drive said second motor directly through said gearing.

5. In combination, a driving motor, a driven motor, a cam, a differential gearing connection between said motors and said cam, an electric contact actuated by said cam, means for adjusting said contact to vary the response thereof to movements of said cam, and electric connections between said contact and said driven motor for controlling the actuation thereof.

6. The combination with a sending instrument subject to continuous oscillation of a small amplitude of a relay device comprising a repeater motor actuated from said instrument, a cam actuated thereby, an electric contact actuated by movement of said cam, and means for adjusting said contact to vary the degree of movement required of said cam to actuate said contact in accordance with the amplitude of oscillation of the sending instrument.

7. The combination with a sending instrument subject to oscillations of a small amplitude, a repeater motor actuated from said instrument, a cam, an electric contact actuated by relative movement of said cam and contact, said movement being imparted by said motor, and means for adjusting said contact to vary the degree of movement required of said cam to actuate said contact in accordance with the amplitude of oscillation of the sending instrument.

8. The combination with a compass subject to continuous oscillations and a transmitter driven thereby, of a repeater motor in circuit with said transmitter, a pair of cams, make and break contacts operable thereby, said cams and contacts being relatively rotatable and the design of the cams being such that slight relative oscillation may occur without changing the existing position of the contacts, a reversible motor actuated by said contacts, differential means connecting said two motors, cams, and contacts, and a transmitter actuated by said reversible motor.

9. The combination with a compass subject to continuous oscillations and a transmitter driven thereby, of a repeater motor in circuit with said transmitter, a plurality of electric contacts relatively positioned by said motor, a reversible motor actuated by said contacts, means controlled by said reversible motor for positioning said contacts, and a lost motion connection between the repeater motor and said contacts, whereby oscillation of the reversible motor is reduced or eliminated.

10. The combination with a compass subject to continuous oscillations and a transmitter driven thereby, of a repeater motor in circuit with said transmitter, a plurality of electric contacts relatively positioned by said motor, a reversible motor actuated by said contacts, means controlled by said reversible motor for positioning said contacts, a lost motion connection between the repeater motor and said contacts, whereby oscillation of the reversible motor is reduced or eliminated, and a transmitter actuated by said motor.

11. The combination with a sending instrument subject to continuous small amplitude oscillation, of a relay transmitting device comprising a repeater motor adapted to be driven from said instrument, a plurality of contact elements, a power motor controlled therefrom, connections including a lost motion device between said motors and contacts, and a transmitter driven by said power motor for transmitting the movements of the sending instrument without the oscillations.

In testimony whereof I have affixed my signature.

MAURICE L. ZOBEL.